Patented Apr. 12, 1927.

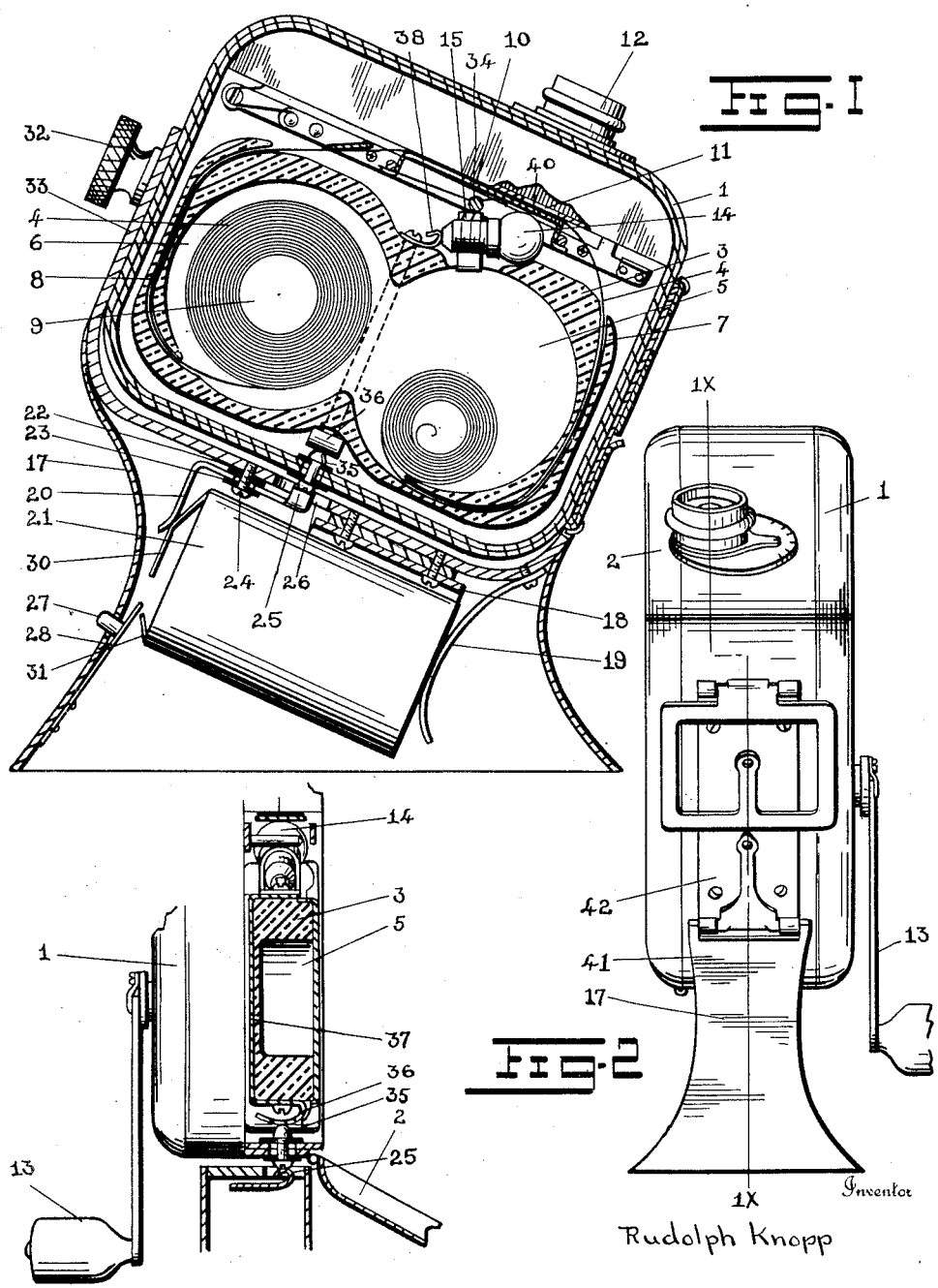

1,624,103

UNITED STATES PATENT OFFICE.

RUDOLPH KNOPP, OF NEW YORK, N. Y.

COMBINATION MOTION-PICTURE CAMERA AND DISPLAY APPARATUS.

Application filed October 30, 1925. Serial No. 65,844.

The object of this invention is to so construct a motion picture camera in which a positive copy of the film that has been exposed in the camera can be run through the camera and viewed through the objective thereof displaying the picture of the film as if it were projected onto a screen.

This and other objects of this invention will be fully illustrated in the drawing, described in the specification and pointed out in the claim at the end thereof.

In the accompanying drawing:

Figure 1 is a vertical longitudinal section of a motion picture camera embodying my film displaying device, the section being taken on the line $1^x$—$1^x$ of Figure 2.

Figure 2 is an end elevation of the motion picture camera as it appears when mounted on the base forming part of the film displaying device.

Figure 3 is a vertical cross section through a portion of the camera illustrating part of the illuminating apparatus.

In the several figures of the drawing like reference numerals indicate like parts.

Motion picture cameras are used for taking the so-called motion pictures which consist of a film with a series of pictures taken thereon taken in rapid succession in short intervals. This film is developed into a negative and from this negative a positive copy is made. My invention consists in modifying the motion picture camera that took the negative picture so that it can be used to take not only the negative but the positive film made therefrom can be put into the same camera and can be viewed through the objective lens of the camera while it is run through the camera and displayed therein to the observer as a moving picture without the use of a separate projecting apparatus and screen such as are ordinarily used in the projecting of moving pictures.

It further permits the display of a positive copy of the developed film during daylight anywhere so that no special place or time is necessary to display a picture taken with the camera.

The display apparatus is shown embodied in a motion picture camera of special make which is adapted for amateur use, but it is understood that any other type of motion picture camera, especially those for amateur use are equally adaptable for the embodiment of the display apparatus. As illustrated in the figures of the drawing, the motion picture camera comprises a suitable casing 1 which opens on one side, being provided with the hinged cover 2. Within the casing is located the film magazine 3 containing the film 4. The magazine is divided into two compartments 5 and 6 having the channels 7 and 8 leading out or into them so that a roll of film placed into one of the compartments can be fed from one compartment to the outside of the magazine and back into the adjacent compartment.

To load the camera prior to the "shooting" of a motion picture, the unexposed roll of film is placed in the compartment 5 of the magazine 3 and the beginning of the roll threaded through the channel 7 leading from this compartment to the outside of the magazine at one end and back into the compartment 6 through the channel 8 at the other end. In the compartment 6 the beginning of the film is attached to the winding roller 9. The magazine thus loaded is placed in the camera with the section of the film located on the outside of the magazine placed in the film track 10 which holds the film in a straight line as it is fed past the exposure opening 11 of the camera.

The exposure opening 11 is in line with the objective and a motion picture shutter (not shown) is interposed between the objective and the exposure opening. A suitable feeding mechanism for the film operates to feed the film past the exposure opening and co-operates with the operation of the shutter so that on the rotation of the handle 13 the film is advanced and exposed in the proper manner.

After the picture has been taken the exposed film is taken out of the magazine and developed and a positive copy made of it. The positive film is then put into the film magazine and mounted in the camera in the same manner as is an unexposed film before the picture is taken.

For the purpose of making the positive copy of the film visible within the camera so that it can be viewed through the objective of the camera, an electric light is provided. This light comprises the incandescent lamp 14 that is mounted in the lamp socket 15. The socket is in turn mounted on the outside of the film magazine and is so located thereon that its light falls on the film directly below the exposure opening 11. As the handle of the camera is rotated with a positive copy of the film mounted in the camera the individual pictures of the film are exposed through the objective and when illuminated by the light from below are visible through the objective giving the moving pictures the same appearance as if they were projected on the screen by the projection machine.

When the motion picture camera is to be used for exhibiting the motion pictures taken by the camera it is mounted on the standard or base 17. This base is hollow and within it is provided the cradle 18 with the spring finger 19 located at one end thereof and the spring contact finger 20 at the other end thereof. A small flash light battery 21 is inserted in the cradle 18 and held in place therein by the sides of the cradle and the spring fingers 19 and 20. The spring contact finger 19 is riveted or otherwise suitably fastened to the inside of the base or standard and makes electrical contact with it. The spring finger 20 is also fastened to the inside of the standard or base 17 but is held electrically insulated from it, being clamped in place between the insulating washers 22 and 23 on the stud 24. The stud 24 is threaded into the casing and holds the spring contact suspended within the base. The spring contact 20 is extended to one side of the stud and has the button 25 formed on the end of the extension. This button projects through the opening 26 in the base and is yieldingly suspended.

The base 17 is also provided with the switch button 27. This button projects through a suitable opening in the back of the base and is mounted on the end of the spring 28 which is fastened with one end to the inside of the base. When the flash light battery is placed in the cradle 18 the spring contact 19 makes yielding contact with the bottom of the battery and forces the terminal 30 of the battery against the spring contact finger 20. The other terminal 31 of the battery is located opposite to the outer and free end of the spring 28. When, therefore, the switch button 27 is depressed the outer end of the spring 28 is brought in contact with the terminal 31 of the battery. As the base 17 is formed of metal the depression of the switch button includes the base in the electric circuit. The frame of the camera is included in this same circuit, being electrically connected with the base by the thumb nut 32 which passes through the upwardly extending arm 33 of the base and is threaded into a threaded sleeve provided in the casing of the camera. In this way the camera is mechanically as well as electrically connected with the base 17. The socket 15 in which the incandescent light 14 is mounted is included in the electric circuit by reason of its contact with the pin 34 forming part of the film guide or track 10. The electric circuit is completed through the button 25 because of its contact with the button 35 which is mounted on the casing of the camera and passes therethrough but is electrically insulated from the camera casing. The inside of the button 35 in turn makes contact with the spring contact 36 formed on the end of the connecting strip 37. This connecting strip is provided on the film magazine and extends from one end of the magazine up one side to the upper end thereof where another spring contact 38 is formed thereon. This last spring contact 38 rests against the end of the incandescent light and thus completes the electric circuit through the filament of the incandescent light. In this way the electric circuit is closed whenever the switch button 27 is depressed so that the incandescent light 14 lights up below the picture on the film located at the exposure opening. In order to avoid a glare from the incandescent light in illuminating the film and diffuse the light so that it illuminates the pictures of the film evenly, a frosted window 40 or other suitable medium useful for this purpose is interposed between the incandescent light 14 and the film. The light thus illuminates the film as it passes the exposure opening and due to rapid succession of the illuminated pictures passing by the exposure opening a perfect motion picture is produced that can be viewed through the objective of the motion picture camera.

In order to securely hold the camera in place on the base while the pictures are viewed therein the arm 33 is provided at one end of the base and is fastened to the camera by means of the thumb screw 32. In addition to this the opposite end of the base is provided with an upwardly curved lug 41, the outer end of which is bifurcated to receive one end of the base plate 42 of the finder of the camera. The arm 33 and thumb screw 32 engaging one end of the camera and the lug 41 engaging the opposite end of the camera and the base plate 42 of the finger thereof, hold the camera in place on the base so that the camera is centered on the base and the whole apparatus is suitably supported on the table while it is being operated.

I claim:

In an apparatus for displaying motion pictures, the combination of a motion picture camera having an objective lens, a standard for said camera adapted to support said camera, a battery mounted in said standard, a pair of electrical contacts on said standard and a pair of electrical contacts on said camera and clamping means on said standard to clamp said camera to said standard with the electrical contacts of one in relative contact with the electric contacts of the other, an electric light mounted within said camera behind the moving film and adapted to illuminate said film on the operation of said switch to make the film in the camera visible thru its objective lens.

In testimony whereof I affix my signature.

RUDOLPH KNOPP.